United States Patent Office 2,870,160  
Patented Jan. 20, 1959

2,870,160
2(BENZOFURANYL AMINO)- AND 2(THIANAPH-THENYL AMINO) OXAZOLINES

Barry M. Bloom, Jackson Heights, N. Y., assignor to Chas. Pfizer & Co., Brooklyn, N. Y., a corporation of Delaware No Drawing. Application July 8, 1957  
Serial No. 670,372

6 Claims. (Cl. 260—307)

This application is concerned with new and useful therapeutic agents. In particular, it is concerned with compounds which are effective regulators of the central nervous system being especially useful as tranquilizing agents.

The compounds of this invention are substituted and unsubstituted 2-(benzofuranylamino)-oxazolines, 2-(thianaphthenylamino)-oxazolines, the pharmaceutically acceptable acid addition salts of these, and with N-(benzofuranyl)-N'-(β-substituted ethyl)-ureas as well as N-(thianaphthenyl)-N'-(β-substituted ethyl)-ureas. The latter compounds are not only intermediates for the preparation of oxazolines, but are also useful themselves as regulators of the central nervous system.

Unsubstituted 2-(2-benzofuranylamino)-oxazoline, 2-(2-thianaphthenylamino)-oxazoline, N-(2-benzofuranyl)-N'-(β-bromoethyl)-urea and N-(2-thianaphthenyl)-N'-(β-bromoethyl)-urea, compounds within the purview of the instant invention, are represented by the formulas:

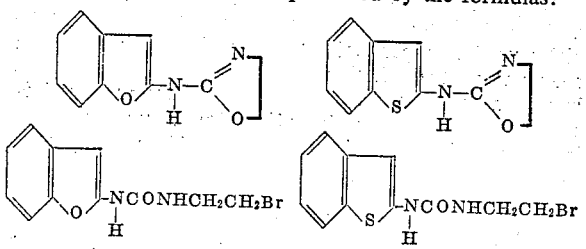

In the above compounds, the nitrogen atom is attached to the 2-position of the benzofuranyl and thianaphthenyl nuclei. It is also intended to include within the purview of the invention compounds in which the nitrogen atom is attached to the 3,4,5,6 or 7 position of the respective nuclei.

The compounds of this invention may be prepared by the reaction between a benzofuranylamine or thianaphthenylamine and an ethyl isocyanate with certain substituents to be recited hereinafter in a position β to the isocyanate group. Alternatively, the products may be prepared by the reaction between a benzofuranyl isocyanate or a thianaphthenyl isocyanate and an ethylamine with similar substituents in a position β to the amine group. Thus it is possible to prepare N-(3-benzofuranyl)-N'-β-chloroethyl urea by the reaction between 3-aminobenzofuran and β-chloroethyl isocyanate or benzofuran-3-isocyanate and β-chloroethylamine. In either case, the oxazolines of this invention are obtained by the elimination of hydrogen chloride from the β-chloroethyl urea. The preparation of this compound by each method is shown below.

(1)

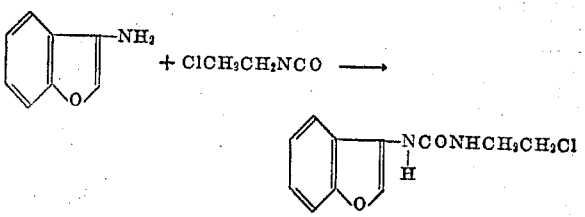

(2)

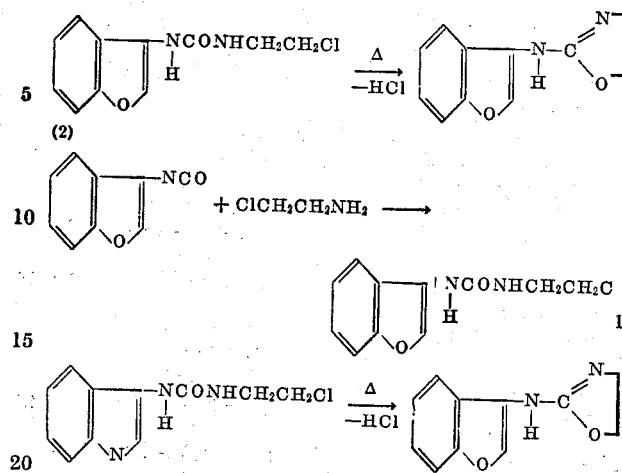

In the reaction shown above, the β-substituted alkylamine and β-substituted isocyanate are chloroethyl compounds and the oxazoline prepared is unsubstituted on both of the methylene groups of the oxazoline ring. By choice of the proper amine or isocyanate it is possible to prepare oxazolines with one or both of the methylene groups either monosubstituted or disubstituted. It is, therefore, also intended to include within the purview of this invention oxazolines in which either or both of the methylene groups are substituted with at least one alkyl group containing up to four carbon atoms, the total number of carbon atoms in these substituents being from one to eight. As an example of the preparation of this type of compound, 2-(4-thianaphthenylamino)-4-ethyl-oxazoline can be prepared by reacting 4-thianaphthenylamine with β-bromobutyl isocyanate and subsequently heating.

For the preparation of the active urea compounds of this invention, the chlorine of the above equations may be replaced with other halogens such as bromine or iodine, or with alkyl or aryl sulfonyl groups such as p-toluenesulfonyloxy or methanesulfonyloxy. In these cases, the active oxazoline is formed by the elimination of hydrogen bromide, hydrogen iodide, p-toluenesulfonic acid and methanesulfonic acid respectively. Since the amino-oxazolines are basic in nature, the acid which has been eliminated from the urea compounds adds to the amino-oxazoline to form an acid addition salt. The free base may be liberated from the acid addition salt using an alkaline reagent such as ammonium hydroxide, sodium hydroxide, sodium bicarbonate, calcium oxide and other obvious equivalents.

Hydrogen atoms of the benzofuranyl or thianaphthenyl groups in the above reactions may be replaced with certain substituents to reduce or enhance the therapeutic effect of the unsubstituted compounds. These substituents include from one to three alkyl groups, alkoxy groups and thioalkyl groups each containing up to four carbon atoms, as well as from one to three chlorine, bromine or iodine atoms.

The α and β carbon atoms of the ethyl portion of the ureas of this invention can also contain substituents which may be alkyl groups containing from one to four carbon atoms, the total number of substituent carbon atoms being from one to eight. The compound which will give 2-(5-thianaphthenylamino)-4,4,5,5-tetraethyl oxazoline is N-(5-thianaphthenyl)-N'-(α,α,β,β-tetraethyl-β-halo)-ethyl urea. Similarly N-(7-benzofuranyl)-N'-(α,α-dibutyl-β-halo)-ethyl urea and N-(6-benzofuranyl)-N'-(α,β-dibutyl-β-halo)-ethyl urea will yield respectively 2-(7-benzofuranylamino)-4,4-dibutyl oxazoline and 2-(6-benzofuranylamino)-4,5-dibutyl oxazoline.

The following list is illustrative of the 2-benzofuranyl ureas of this invention. Analogous 2-thianaphthenyl ureas as well as ureas in which the nitrogen is substituted at other than the 2-position in the benzofuran and thianaphthelene nuclei as well as the corresponding oxazolines are active and included within the scope of the present invention but are not named for the sake of brevity.

N-(2-benzofuranyl)-N'-β-chloroethyl urea
N-(3-chloro-2-benzofuranyl)-N'-β-(p-toluenesulfonyloxy)-ethyl urea
N-(3,4-diiodo-2-benzofuranyl)-N'-β-iodoethyl urea
N-(4,5-dibromo-2-benzofuranyl)-N'-(α-butyl-β-methanesulfonyloxy)-ethyl urea
N-(3,4,5-trichloro-2-benzofuranyl)-N'-(α-n-propyl-β-chloro)-ethyl urea
N-(3-ethyl-9-benzofuranyl)-N'-β-bromoethyl urea
N-(2-benzofuranyl)-N'-(α,α-dimethyl-)β-bromoethyl urea
N-(5,6-diethyl-2-benzofuranyl)-N'-β-iodoethyl urea
N-(3-n-butoxy-2-benzofuranyl)-N'-β-methanesulfonyloxy ethyl urea
N-(4,7-dimethoxy-2-benzofuranyl)-N'-(α-methyl-β-p-toluenesulfonyloxy)-ethyl urea
N-(5,6-dithiopropyl-2-benzofuranyl)-N'-β-bromoethyl urea
N-(3-thioethyl-2-benzofuranyl)-N'-(α-methyl-β-butyl-β-iodo)-ethyl urea
N-(4,5-diethoxy-2-benzofuranyl)-N'-β-chloroethyl urea The amines and isocyanates necessary for the preparation of the compounds of this invention are known or can be prepared by procedures known in the art. The ethyl isocyanates, for example, are prepared by treatment of the corresponding acid chlorides with sodium azide. The ethylamines can be prepared by the Hofmann reaction employing the corresponding amides. Benzofurans are generally prepared by ring closure of phenols and phenol ethers, by the cyclization of O-carbalkoxymethoxy benzaldehydes or by the condensation of a sodium phenoxide with the appropriately substituted alkyl haloacetoacetate. These methods are discussed in, for example, "Gilman's Organic Chemistry" by Wiley, R. H., vol. IV, page 741, John Wiley & Sons, Inc., 1953. Thianaphthenes are prepared by the cyclization of O-mercapto-ω-chlorostyrenes or by oxidative cyclization of O-mercapto-cinnamic acid. These procedures are described by Steinkopf in "Die Chemie des Thiophens," Theodor Steinkopf, Dresden, 1941. The various substituted compounds are prepared by conventional means involving either direct substitution on the benzofuran and thianaphthene nuclei or substitution prior to cyclization.

In carrying out the reaction for the preparation of the valuable compounds of the instant invention, the amine and isocyanate are contacted in benzene or an equivalent aromatic solvent. Hydrocarbon solvents, both aromatic and aliphatic can be used. Halogenated and nitrated hydrocarbon solvents are also useful. There may be mentioned by way of example, chloroform, carbon tetrachloride, ethylene chloride, ethylene dichloride, chlorobenzene, toluene, xylene, nitrobenzene and nitrotoluene. Lower oxygenated aliphatic solvents, particularly others containing up to eight carbon atoms, are particularly useful.

The reaction between an amine and an isocyante generally takes place without the application of heat. In fact, with some of the more reactive compounds, it is best to carry out the reaction in an ice bath. However, as in other reactions of this type, the progress of the reaction may be hastened by the use of heat. It has been found that temperatures from 0° to 110° C. are useful and that most of the amines and isocyanates react to form products of this invention below 50° C.

Formation of an oxazoline acid addition salt by the elimination of an acid from the urea compound is best carried out in refluxing aqueous solution although lower alkanols such as methanol, ethanol, propanol, or butanol may be used.

Although both reactions of the synthesis proceed readily at atmospheric pressure, for certain applications it may be desirable to use increased pressure. Pressures as high as 100 atmospheres may be useful.

The compounds of this invention are useful as central nervous system depressants and when administered to rodents, it is found that they significantly reduce the spontaneous motility of these animals. Similar results are observed with monkeys and other higher animals.

Each of the types of compounds of this invention has its own specific advantage. For example, although both the ureas and the oxazolines are effective therapeutically, the oxazolines produce their effect in a shorter time. On the other hand, the ureas, while they require a somewhat longer time to take their effect, are less toxic and can, therefore, be administered in larger dosages. This suggests that under certain circumstances it may be advantageous to administer both agents simultaneously to produce both a rapid and a prolonged therapeutic action.

The ureas are neutral and do not form the acid addition salts. The oxazolines, however, are weakly basic and do form acid addition salts. These salts because of their water solubility, are more readily utilizable for the preparation of aqueous parenteral solutions than are the free bases.

With reference to the oxazolines of this invention, it is specifically intended to include within the purview of the invention the acid addition salts which these compounds form with acids having pharmaceutically acceptable anions. The term, "pharmaceutically acceptable anion" has a definite meaning to one skilled in the art. It is defined as a non-toxic anion of any of the simple acids commercially used therapeutically to neutralize basic medicinal agents when the salt thereof is to be administered to a human host. These acids include, for example, hydrochloric, hydrobromic, hydroiodic, sulfuric, succinic, maleic, tartaric, citric, glycolic and others. The pharmaceutical activity of the molecule is primarily a function of the cation, the anion serving chiefly to supply electric neutrality.

By reference to the reaction described above, it can be seen that in the ordinary practice of the process of the invention, the oxazolines produced will be hydrobromides, hydrochlorides, hydriodides, methanesulfonic acids or p-toluenesulfonic acids. These acids can be converted to other pharmaceutically acceptacle acids by procedures well known to those skilled in the art. One high useful method comprises contacting the acid addition salt with a basic anion exchange resin, for example, a highly basic compound such as the one available from Rohm & Haas Company under the name "Amberlite IRA-400". This resin is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt prepared as described above and a further anion exchange takes place converting the acid addition salt to the citrate and leaving the anion of the original salt on the resin. The citrate resin can be recovered from the eluate by a number of methods such as evaporation or solvent precipitation. This same procedure can be used to prepare nitrates, sulfates, acetates, and other acid addition salts.

The agents of this invention may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The compounds of this invention are central nervous system regulators and are useful in the same manner as other regulators of the central nervous system. The dosage is generally of the same order of magnitude as the dosage required with other therapeutic agents of this type.

In certain instances it may be found that because of their high order of activity the optimum dosage of the compounds of this invention will be lower than the optimum dosage of other compounds generally recommended for the same use. In general, the physician or veterinarian will determine the dosage which will be most suitable for a particular application, and as might be expected, it will vary with the particular drug chosen and with the desired effect. It will vary with the age, weight and general health of the patient under treatment and with various other factors which will be determined by the physician or veterinarian in attendance. When the drugs are administered orally a larger quantity will be required to produce the same effect as a smaller quantity given parenterally. It has been found that parenteral administration of from 0.5 mg. to 250 mg. of active agent generally gives the desired effect.

The compositions of this invention may take a variety of forms. Various diluents may be employed and the percentage of active ingredients may be varied. It is necessary that an active ingredient form a proportion of the composition such that a suitable dosage form will be obtained. Obviously compositions with less than 0.005% by weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice-versa.

The following examples are given solely for the purpose of illustration and are not to be construed as limitations of this invention, many variations of which are possible without departing from the spirit or scope thereof.

EXAMPLE I

N-(2-benzofuranyl)-N'-β-chloroethyl urea

A solution of ice cold 50% potassium hydroxide (150 g.) is shaken with a suspension of 133 g. of β-chloroethylamine hydrochloride in 420 ml. of benzene. The benzene layer containing the free base is separated and dried over a small amount of potassium hydroxide. The drying agent is removed by filtration. To this solution an equimolar benzene solution of 2-benzofuranyl isocyanate is added dropwise with cooling. The solution is allowed to stand for one hour during which time the product separates and is recovered by filtration.

The same procedure was used to prepare N-(3-benzofuranyl)-N'-β-chloroethyl urea using equimolar amounts of β-chloroethylamine hydrochloride and 3-benzofuranyl isocyanate.

EXAMPLE II

N-(2-benzofuranyl)-N'-β-iodoethyl urea

A solution of ice cold 50% potassium hydroxide (150 g.) is shaken with a suspension of 133 g. of β-iodoethylamine hydrochloride in 420 ml. of benzene. The benzene layer containing the free base is separated and dried over a small amount of potassium hydroxide. The drying agent is removed by filtration. To this solution an equimolar benzene solution of 2-benzofuranyl isocyanate is added dropwise with cooling. The solution is allowed to stand for one hour during which time the product separates and is recovered by filtration.

The same procedure was used to prepare N-(3-benzofuranyl)-N'-β-iodoethyl urea using equimolar amounts of β-iodoethylamine hydrochloride and 3-benzofuranyl isocyanate.

EXAMPLE III

N-(2-benzofuranyl)-N'-β-bromoethyl urea

A solution of ice cold 50% potassium hydroxide (150 g.) is shaken with a suspension of 133 g. of β-bromoethylamine hydrochloride in 420 ml. of benzene. The benzene layer containing the free base is separated and dried over a small amount of potassium hydroxide. The drying agent is removed by filtration. To this solution an equimolar benzene solution of 2-benzofuranyl isocyanate is added dropwise with cooling. The solution is allowed to stand for one hour during which time the product separates and is recovered by filtration.

The same procedure was used to prepare N-(3-benzofuranyl)-N'-β-bromoethyl urea using equimolar amounts of β-bromoethylamine hydrochloride and 3-benzofuranyl isocyanate.

EXAMPLE IV

2-(2-benzofuranylamino)-oxazoline

One liter of water is brought to boiling and 15 g. of N-(2-benzofuranyl)-N'-β-bromoethyl urea is added. At the end of fifteen minutes reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(3-benzofuranylamino)-oxazoline was similarly prepared from N'-(3-benzofuranyl)-N'-β-bromoethyl urea.

EXAMPLE V

N-(2-thianaphthenyl)-N'-β-chloroethyl urea

A solution of ice cold 50% potassium hydroxide (150 g.) is shaken with a suspension of 133 g. of β-chloroethylamine hydrochloride in 420 ml. of benzene. The benzene layer containing the free base is separated and dried over a small amount of potassium hydroxide. The drying agent is removed by filtration. To this solution an equimolar benzene solution of 2-thianaphthenyl isocyanate is added dropwise with cooling. The solution is allowed to stand for one hour during which time the product separates and is recovered by filtration.

The same procedure was used to prepare N-(3-thianaphthenyl)-N'-β-chloroethyl urea using equimolar amounts of β-chloroethylamine hydrochloride and 3-thianaphthenyl isocyanate.

EXAMPLE VI

N-(2-thianaphthenyl)-N'-β-iodoethyl urea

A solution of ice cold 50% potassium hydroxide (150 g.) is shaken with a suspension of 133 g. of β-iodoethylamine hydrochloride in 420 ml. of benzene. The benzene layer containing the free base is separated and dried over a small amount of potassium hydroxide. The drying agent is removed by filtration. To this solution an equimolar benzene solution of 2-thianaphthenyl isocyanate is added dropwise with cooling. The solution is allowed to stand for one hour during which time the product separates and is recovered by filtration.

The same procedure was used to prepare N-(3-thianaphthenyl)-N'-β-iodoethyl urea using equimolar amounts of β-iodoethylamine hydrochloride and 3-thianaphthenyl isocyanate.

EXAMPLE VII

*N-(2-thianaphthenyl)-N'-β-bromoethyl urea*

A solution of ice cold 50% potassium hydroxide (150 g.) is shaken with a suspension of 133 g. of β-bromoethylamine hydrochloride in 420 ml. of benzene. The benzene layer containing the free base is separated and dried over a small amount of potassium hydroxide. The drying agent is removed by filtration. To this solution an equimolar benzene solution of 2-thianaphthenyl isocyanate is added dropwise with cooling. The solution is allowed to stand for one hour during which time the product separates and is recovered by filtration.

The same procedure was used to prepare N-(3-thianaphthenyl)-N'-β-bromoethyl urea using equimolar amounts of β-bromoethylamine hydrochloride and 3-thianaphthenyl isocyanate.

EXAMPLE VIII

*2-(2-thianaphthenylamino)-oxazoline*

One liter of water is brought to boiling and 15 g. of N-(2-thianaphthenyl)-N'-β-bromoethyl urea is added. At the end of fifteen minutes reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(3-thianaphthenylamino)-oxazoline was similarly prepared from N-(3-thianaphthenyl)-N'-β-bromoethyl urea.

EXAMPLE IX

*N-(3,4-dimethyl-5-benzofuranyl)-N'-β-chlorobutyl urea*

A solution of ice cold 50% potassium hydroxide (150 g.) is shaken with a suspension of 123 g. of β-chlorobutylamine hydrochloride in 420 ml. of benzene. The benzene layer containing the free base is separated and dried over a small amount of potassium hydroxide. The drying agent is removed by filtration. To this solution an equimolar benzene solution of 3,4-dimethyl-5-benzofuranyl isocyanate is added dropwise with cooling. The solution is allowed to stand for one hour during which time the product separates and is recovered by filtration.

EXAMPLE X

*2-(3,4-dimethyl-5-benzofuranylamino)-5-ethyl oxazoline*

One liter of water is brought to boiling and 15 g. of N-(3,4-dimethyl-5-benzofuranyl)-N'-β-chlorobutyl urea is added. At the end of fifteen minutes reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(3,4-dimethyl-2-benzofuranylamino)-oxazoline was similarly prepared from N'-(3,4-dimethyl-2-benzofuranyl)-N'-β-bromoethyl urea.

EXAMPLE XI

*N-(2,3-dithiobutyl-4-thianaphthenyl)-N'-β-chlorohexyl urea*

A solution of ice cold 50% potassium hydroxide (150 g.) is shaken with a suspension of 140 g. of β-chlorohexylamine hydrochloride in 450 ml. of benzene. The benzene layer containing the free base is separated and dried over a small amount of potassium hydroxide. The drying agent is removed by filtration. To this solution an equimolar benzene solution of 2,3-dithiobutyl-4-thianaphthenyl isocyanate is added dropwise with cooling. The solution is allowed to stand for one hour during which time the product separates and is recovered by filtration.

EXAMPLE XII

*2-(2,3-dithiobutyl-4-thianaphthenylamino)-5-butyl-oxazoline*

One liter of water is brought to boiling and 15 g. of N-(2,3-dithiobutyl-4-thianaphthenyl)-N'-β-chlorohexyl urea is added. At the end of fifteen minutes reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(2,3-dithiobutyl-2-thianaphthenylamino)-oxazoline was similarly prepared from N'-(2,3-dithiobutyl-2-thianaphthenylamino)-N'-β-bromoethyl urea.

EXAMPLE XIII

*N-(4,5,6-tributoxy-7-benzofuranyl)-N'-α,β-dimethyl-β-chloroethyl urea*

A solution of ice cold 50% potassium hydroxide (150 g.) is shaken with a suspension of 120 g. of α,β-dimethyl-β-bromoethylamine hydrobromide in 500 ml. of benzene. The benzene layer containing the free base is separated and dried over a small amount of potassium hydroxide. The drying agent is removed by filtration. To this solution an equimolar benzene solution of 4,5,6-tributoxy-8-benzofuranyl isocyanate is added dropwise with cooling. The solution is allowed to stand for one hour during which time the product separates and is recovered by filtration.

EXAMPLE XIV

*2-(4,5,6-tributoxy-7-benzofuranylamino)-4,5-dimethyloxazoline*

One liter of water is brought to boiling and 15 g. of N-(4,5,6-tributoxy-7-benzofuranyl)-N'-α,β-dimethyl-β-chloroethyl urea is added. At the end of fifteen minutes reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(4,5,6-tributoxy-3-benzofuranylamino)-oxazoline was similarly prepared from N-(4,5,6-tributoxy-3-benzofuranyl)-N'-β-bromoethyl urea.

EXAMPLE XV

N-(2,4-dibutyl-3-thianaphthenyl)-N'-β-(p-toluenesulfonyloxy) ethyl urea

A solution of ice cold 50% potassium hydroxide (150 g.) is shaken with a suspension of 100 g. of 2,4-dibutyl-3-thianaphthenylamine hydrobromide in 420 ml. of benzene. The benzene layer containing the free base is separated and dried over a small amount of potassium hydroxide. The drying agent is removed by filtration. To this solution an equimolar benzene solution of β-(p-toluenesulfonyloxy) ethyl isocyanate is added droywise with cooling. The solution is allowed to stand for one hour during which time the product separates and is recovered by filtration.

EXAMPLE XVI

2-(2,4-dibutyl-3-thianaphthenylamino)-oxazoline

One liter of water is brought to boiling and 15 g. of N - (2,4 - dibutyl-3-thianaphthenyl)-N'-β-(p-toluenesulfonyloxy) ethyl urea is added. At the end of fifteen minutes' reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(2,4-dibutyl-4-thianaphthenylamino)-oxazoline was similarly prepared from N-(2,4-dibutyl-4-thianaphthenyl)-N'-β-bromoethyl urea.

EXAMLE XVII

N-(3,4,5-trichloro-6-benzofuranyl)-N'-β-chloroethyl urea

A solution of ice cold 50% potassium hydroxide (150 g.) is shaken with a suspension of 120 g. of β-chloroethylamine hydrochloride in 420 ml. of benzene. The benzene layer containing the free base is separated and dried over a small amount of potassium hydroxide. The drying agent is removed by filtration. To this solution an equimolar benzene solution of 3,4,5-trichloro-6-benzofuranyl isocyanate is added dropwise with cooling. The solution is allowed to stand for one hour during which time the product separates and is recovered by filtration.

EXAMPLE XVIII

2-(3,4,5-trichloro-6-benzofuranylamino)-oxazoline

One liter of water is brought to boiling and 15 g. of N-(3,4,5-trichloro-6-benzofuranyl)-N'-β-chloroethyl urea is added. At the end of fifteen minutes reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(3,4,5-trichloro-7-benzofuranylamino)-oxazoline was similarly prepared from N'-(3,4,5-trichloro-7-benzofuranyl)-N'-β-bromoethyl urea.

EXAMPLE XIX

N-(2-bromo-3-iodo-4-thianaphthenyl)-N'-β-bromoethyl urea

A solution of ice cold 50% potassium hydroxide (150 g.) is shaken with a suspension of 123 g. of β-bromoethylamine hydrobromide in 420 ml. of benzene. The benzene layer containing the free base is separated and dried over a small amount of poatssium hydroxide. The drying agent is removed by filtration. To this solution an equimolar benzene solution of 2-bromo-3-iodo-4-thianaphthenyl isocyanate is added dropwise with cooling. The solution is allowed to stand for one hour during which time the product separates and is recovered by filtration.

EXAMPLE XX

2-(2-bromo-3-iodo-4-thianaphthenylamino)-oxazoline

One liter of water is brought to boiling and 15 g. of N-(2-bromo-3-iodo-4-thianaphthenyl)-N'-β - bromoethyl urea is added. At the end of fifteen minutes reflux time all except a very small amount of material dissolves. The flask is cooled in an ice bath and the small amount of insoluble material, along with an additional quantity of material which separates on cooling, is removed by filtration. A 14% solution of ammonium hydroxide (30 ml.) is added slowly and a precipitate forms. The precipitate is extracted with three 250 ml. portions of chloroform and the combined extracts washed with water. The organic layer is dried over anhydrous sodium sulfate and concentrated in vacuo. The crystalline residue which forms is triturated with ether and dried.

The compound 2-(2-bromo-3-iodo - 4 - benzofuranylamino)-oxazoline was similarly prepared from N'-(2-bromo-3-iodo-4-benzofuranyl)-N'-β-bromoethyl urea.

EXAMPLE XXI

2-(5,6-dibromo-3-thianaphthenylamino)-oxazoline sulfate

A 15% aqueous solution of 2-(5,6-dibromo-3-thianaphthenylamino)-oxazoline hydrochloride is stirred for three hours with an anion exchange resin which had been previously washed with aqueous sulfuric acid. The resin was removed by filtration and the solvent removed in vacuo to leave a sulfuric acid addition salt as a residue.

Included among the anion exchange resin used for this process were Amberlite IRA–410 and Amberlite IRA-400 available from Rohm & Haas Company, as well as Dowex–1 and Dowex–2 available from the Dow Chemical Company.

A number of other acid addition salts are prepared using this procedure and these include the acetate, citrate, valerate, gluconate, nitrate, tartrate and phosphate.

EXAMPLE XXII

A tablet base is prepared by blending the following ingredients in the proportion by weight indicated.

| | Grams |
|---|---|
| Sucrose, U. S. P. | 82.0 |
| Tapioca starch | 13.6 |
| Magnesium stearate | 4.4 |

Into this tablet there is blended a sufficient amount of 2-(3-methyl-2-benzofuranylamino)-oxazoline to provide tablets each containing 25 mg. of active ingredient.

EXAMPLE XXIII

Into the tablet base of Example XXII there is blended a sufficient amount of N-(2-iodo-3-thianaphthenyl)-N'-β-bromoethyl urea to provide tablets each containing 0.5 mg. of active ingredient.

EXAMPLE XXIV

A tablet base is prepared by blending the following ingredients in the proportion by weight indicated.

| | Grams |
|---|---|
| Sucrose, U. S. P. | 80.3 |
| Tapioca starch | 13.2 |
| Magnesium stearate | 6.5 |

Into this base there is blended a sufficient amount of N-(2,3-diethoxy-4-benzofuranylamino)-oxazoline to provide tablets each containing 50 mg. of active ingredient.

EXAMPLE XXV

Into the tablet base of Example XXIV there is blended a sufficient amount of N-(2,3-dibromo-5-thianaphthenylamino)-oxazoline to provide tablets each containing 1 mg. of active ingredient.

EXAMPLE XXVI

An aqueous solution containing 0.005% by weight of N-(3-ethyl-2-benzofuranylamino)-oxazoline hydrochloride is prepared by dissolving the salt in U. S. P. distilled water.

EXAMPLE XXVII

Sesame oil is sterilized by heating at 120° for two hours. To this oil a sufficient quantity of pulverized N-(2-chloro-3-benzofuranyl)-N'-β-bromoethyl urea is added to make a 0.025% suspension by weight. The solid is thoroughly dispersed in the oil with the use of a colloid mill. It is then filtered through a 100 to 150 mesh screen and poured into sterile vials.

What is claimed is:

1. A compound selected from the group consisting of substituted and unsubstituted 2-(benzofuranylamino)-oxazolines, 2-(thianaphthenylamino)-oxazolines and their pharmaceutically acceptable acid addition salts wherein; (a) each substituent on a substituted benzofuranyl and thianaphthenyl ring is selected from the group consisting of alkyl, alkoxy and thioalkyl groups each containing up to four carbon atoms, and chlorine, bromine and iodine atoms, there being from one to three such substituents, and (b) each substituent on a substituted methylene group of the oxazoline ring is selected from the group consisting of one to four carbon atom alkyl groups, there being a total of from one to eight carbon atoms in such substituents.

2. 2-(2-benzofuranylamino)-oxazoline.
3. 2-(2-thianaphthenylamino)-oxazoline.
4. 2-(3,4-dimethyl-5-benzofuranylamino)-5-ethyloxazoline.
5. 2-(2,3-dithiobutyl-4-thianaphthenylamino)-5-butyloxazoline.
6. 2-(2,4-dibutyl-3-thianaphthenylamino)-oxazoline.

References Cited in the file of this patent

UNITED STATES PATENTS

| | | |
|---|---|---|
| 2,027,031 | Engelmann | Jan. 7, 1936 |
| 2,450,807 | McCarthy | Oct. 5, 1948 |
| 2,517,826 | Avakian et al. | Aug. 8, 1950 |
| 2,548,704 | Coleman et al. | Apr. 10, 1951 |
| 2,727,042 | Jacob | Dec. 13, 1955 |
| 2,811,529 | Bloom | Oct. 29, 1957 |